United States Patent [19]
Vind

[11] 4,118,753
[45] Oct. 3, 1978

[54] STARTING DEVICE FOR AN ASYNCHRONOUS MOTOR

[75] Inventor: Holger Vilhelm Vind, Nordborg, Denmark

[73] Assignee: Danfoss A/S, Nordborg, Denmark

[21] Appl. No.: 798,175

[22] Filed: May 18, 1977

[30] Foreign Application Priority Data

May 22, 1976 [DE] Fed. Rep. of Germany ....... 2623119

[51] Int. Cl.² .............................................. H05K 7/20
[52] U.S. Cl. ..................................... 361/331; 361/383
[58] Field of Search ............... 361/380, 331, 383, 384; 318/195

[56] References Cited

U.S. PATENT DOCUMENTS

| | | | |
|---|---|---|---|
| 3,323,020 | 5/1967 | Lenart et al. | 361/383 |
| 3,462,553 | 8/1969 | Spranger | 361/383 |
| 3,475,657 | 10/1969 | Knowles | 361/383 |
| 3,940,665 | 7/1974 | Seki | 361/383 |

*Primary Examiner*—Herman J. Hohauser
*Attorney, Agent, or Firm*—Wayne B. Easton

[57] ABSTRACT

The invention relates to a starting device for an asynchronous motor in which device a capacitor and a PTC resistor form a series circuit. A housing has three chambers formed by two interior walls and a cover. The capacitor is in one end chamber, the PTC resistor in the middle chamber, and the lead ends which are connectable to a motor winding in the other end chamber. The PTC resistor is subject to heating and the housing has vent holes for ventilating the middle resistor chamber.

1 Claim, 1 Drawing Figure

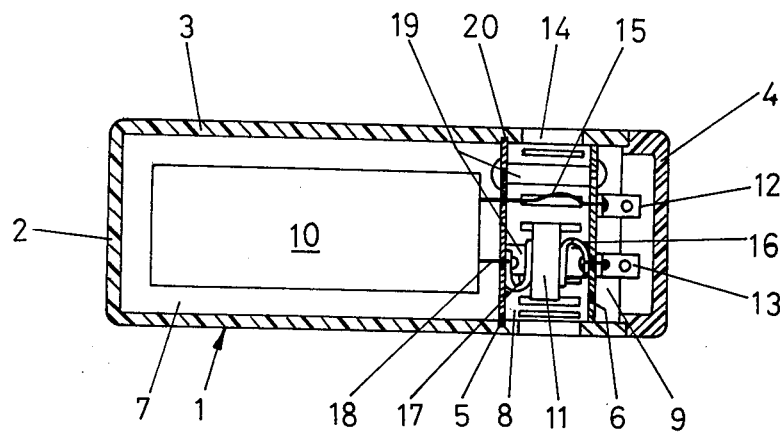

STARTING DEVICE FOR AN ASYNCHRONOUS MOTOR

The invention relates to a starting device for an asynchronous motor in which a condenser and a PTC resistor form a series circuit.

A circuit is known in which a starter condenser, a PTC resistor and the starter coil of an asynchronous motor are in series. The PTC resistor is dimensioned so that it is so strongly heated by the starting current flowing therethrough that, at the end of the desired starting period, it has such a high temperature that the resistance then obtaining will keep the current adequately small in the starting branch. Recommended PTC resistors are those of which the resistance temperature curve has a flat section below a limiting temperature and a steep section above this limiting temperature. For normal applications a limiting temperature of about 100° C. is considered desirable, so that an adequate temperature difference is available for heating purposes, which temperature difference will bring about an adequately long starting period without an excessive mass for the PTC resistor. In operation, the remainder of the current flowing through must then maintain a temperature of roughly 120° C.

Such a starting device has a very simple construction and no moving parts. The PTC resistor does not only serve as a time element but also as a protecting device for the starting branch. It also serves as a series resistance for the condenser to prevent excessively fast charging and discharging and consequent undesirable current pulses.

The invention is based on the object of providing a starting device that is based on this starting circuit, is suitable for practical use and has only small dimensions.

This problem is solved in that the condenser is in the form of an electrolytic condenser and accommodated in the same housing as the PTC resistor but separated therefrom by an intermediate wall, that the outer wall of the housing has ventilation apertures in the region of the PTC resistor, and that the housing further carries two connecting devices accessible from the outside.

In this starting device an electrolytic condenser is used as the condenser, which takes up comparatively little space. However, electrolytic condensers are sensitive to temperature; if one disregards expensive special constructions, they must not exceed a temperature of 80° C. Although the PTC resistor must be kept at a comparatively high temperature during the normal operating period, it can be arranged relatively closely adjacent the electrolytic condenser because the intermediate wall prevents the transmission of heat to the condenser by radiation or convection. Nor does the PTC resistor tend to heat the housing to a temperature corresponding to its temperature because the parts of the housing subjected to radiation are cooled by the air flowing in and out through the ventilation apertures. Since the PTC resistor is itself also cooled by the air, it is possible to select its limiting temperature and thus also its operating temperature at a lower value without thereby shortening the starting period determined by the heating operation. in addition, all important components of the starting device are combined in a single housing and safely accommodated in it so that, on final assembly, it is merely necessary to connect leads to the two connecting devices that are accessible from the outside.

A particularly simple construction is achieved if the electrolytic condenser is at least partially carried by the intermediate wall by way of connecting wires leaving at one end. The one connecting wire can then lead directly to the contact for the PTC resistor on the other side of the intermediate wall.

The connecting devices can be carried by a second intermediate wall. This likewise results in short connecting leads.

In a preferred embodiment, it is ensured that the housing is divided into three sections by two intermediate walls, the first section receiving the electrolytic condenser, the middle section having the ventilation apertures in the outer wall and receiving the PTC resistor and the third section containing the connecting devices. This results in an arrangement which is compact and makes do with short leads. The two intermediate walls bound the chamber containing the PTC resistor in such a way that very good ventilation is obtained if the three sections are juxtaposed.

In particular, the housing may be cup-shaped and the third section disposed at the open end and closed by a cover. In this way all the components are protectingly accommodated. However, the connecting devices are readily accessible after removing the cover.

Assembly is facilitated if two intermediate walls are held apart by supports and each carry a plate spring between which the substantially disc-shaped PTC resistor is held. All electrical components are then held by the intermediate walls. The unit thus formed can be readily inserted in a housing either the aforementioned cup-shaped housing or one that is divided in an axial plane, i.e. consists of two concave segments.

It is also desirable if the first section is adjacent the base of a cup-shaped housing and the first intermediate wall is tightly engaged in an internal groove of the outer wall of the housing. In this way one achieves a high degree of safety if the electrolytic condenser should happen to leak. It is disposed in a sealed space and the electrolytic fluid can cause no damage. A short circuit in the condenser has no disadvantageous effects on the electric motor because the latter is protected by the PTC resistor.

The invention will now be described in more detail with reference to an example illustrated in the drawing which shows a diagrammatic longitudinal section of a starting device according to the invention.

A cup-shaped housing 1 of a somewhat resilient plastics material comprises a base 2 and a peripheral wall 3. It is closed at the open end by a cover 4 of similar material. The interior is sub-divided into three sections 7, 8 and 9 by two intermediate walls 5 and 6. An electrolytic condenser 10 is disposed in the section 7, a PTC resistor 11 in the section 8 and two plug connectors 12 and 13 in the section 9. The peripheral wall 3 of the housing 1 is provided with ventilation apertures 14 in the region of the section 8. The intermediate walls 5 and 6 consist of a stiff electrically insulating plastics material. In addition, at least the intermediate wall should be of heat insulating material.

The plug connector 12 is connected directly to a connecting wire 15 of the electrolytic condenser 10. The plug connector 13 is electrically connected to a plate spring 16 disposed on the opposite side of the intermediate wall 6. The connection can, for example, be effected by a rivet. A second plate spring 17 is secured to the opposite side of the intermediate wall 5 and connected to the second connecting wire 18 of the electrolytic condenser 10. The two intermediate walls are held apart at a predetermined spacing by supports 19. Consequently the PTC resistor 11 can be held between the two plate springs 16 and 17 under spring force. The intermediate wall 5 has a somewhat larger diameter than the internal diameter of the peripheral wall 3 and is tightly snapped into an internal groove 20 of the peripheral wall.

During assembly, the procedure is such that the parts 12, 13 and 16 are first secured to the intermediate wall 6 and the part 17 to the intermediate wall 5. The intermediate walls are then interconnected by three supports 19. The connecting wires of the condenser 10 are now passed through the intermediate wall 5 and soldered to the spring plate 17 and the connecting plug 12 respectively. Thereafter the disc-shaped PTC resistor 11 is pushed between the plate springs 16 and 17 from the side. The pre-assembled structural unit thus formed is now pushed into the end of the somewhat resiliently expanding housing 3 until the intermediate wall 5 engages in the circumferential groove 20.

Such a starting device can be secured directly to the motor in a preferably horizontal position with the aid of fastening means (not shown). It is then merely necessary to remove the cover 4, to place the connecting leads of the starting branch over the plugs 12 and 13 and finally replace the cover 4, the connecting leads being led out through holes (not shown) in the cover 4. In operation, during each starting step a comparatively strong phase-displaced current will first flow through the series circuit of the condenser 10 and PTC resistor 11 as well as the starter coil. This heats the PTC resistor. As soon as it has exceeded a limiting temperature, its resistance increases. The current in the starting branch drops to a harmless low value which is nevertheless sufficient to keep the PTC resistor to a temperature above the limiting value. However, this temperature cannot have any effect on the electrolytic condenser 10 because the radiated heat is deflected by the intermediate wall 5 and transfer of heat by convection is substantially suppressed because the air in the section 8 cannot become heated but is continuously replaced by fresh air.

The housing could also be constructed differently. For example, the connecting devices 12 and 13 may be secured to the wall of the housing itself. Whilst retaining the pre-assembled constructional unit, the housing may also be parted in a longitudinal axial plane, i.e. formed as two shell segments.

I claim:

1. A starting device for an asynchronous motor, comprising, first and second disk shaped wall elements, means connecting said wall elements and maintaining them in spaced apart parallel relation, first and second plug connectors attached to the outer side of said first wall element, first and second U-shaped springs attached respectively to the inner sides of said first and second wall elements in axial alignment with said first plug connector, means extending through said first wall element electrically connecting said first plug connector and said first spring, a disk shaped PTC resistor disposed between and held in place by said springs, an electrolytic capacitor having leads at one end thereof attached to the outer side of said second wall element, one of said capacitor leads extending through said second wall element into electrical contact with said second U-shaped spring, the other of said capacitor leads extending through both of said wall elements into electrical contact with said second plug connector, said above elements constituting a unified chassis, a cylindrically shaped housing for said chassis having open and closed ends, an annular groove in said housing adjacent to and in spaced relation to said open end thereof, said chassis being mountable in said housing with said capacitor adjacent said closed end thereof and said second wall element being snapped into said groove, and ventilation openings in said housing between said first and second chassis walls.

* * * * *